(12) United States Patent
Cherepinsky

(10) Patent No.: US 9,102,400 B2
(45) Date of Patent: Aug. 11, 2015

(54) METHODS AND SYSTEMS FOR PROVIDING CONSTANT-FEEL, MULTI-AXIS TACTILE CUES

(75) Inventor: Igor Cherepinsky, Sandy Hook, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 384 days.

(21) Appl. No.: 13/278,387

(22) Filed: Oct. 21, 2011

(65) Prior Publication Data

US 2013/0099064 A1    Apr. 25, 2013

(51) Int. Cl.
*B64C 13/46* (2006.01)
*B64C 13/50* (2006.01)
*B64C 13/04* (2006.01)
*G05D 3/00* (2006.01)
*G05B 11/01* (2006.01)

(52) U.S. Cl.
CPC .............. *B64C 13/503* (2013.01); *B64C 13/04* (2013.01); *B64C 13/46* (2013.01)

(58) Field of Classification Search
USPC ....................................... 701/1–539; 244/223
See application file for complete search history.

(56) References Cited

U.S. PATENT DOCUMENTS

| 4,420,808 | A |   | 12/1983 | Diamond et al. |
|---|---|---|---|---|
| 5,264,768 | A |   | 11/1993 | Gregory et al. |
| 5,694,014 | A | * | 12/1997 | Hegg et al. ..................... 318/564 |
| 6,679,458 | B2 |   | 1/2004 | Einthoven et al. |
| 6,695,264 | B2 | * | 2/2004 | Schaeffer et al. ............. 244/223 |
| 7,098,811 | B2 |   | 8/2006 | Augustin et al. |
| 7,930,074 | B2 |   | 4/2011 | Cherepinsky et al. |
| 7,931,231 | B2 |   | 4/2011 | Cherepinsky et al. |
| 8,025,256 | B2 | * | 9/2011 | Miller et al. ................... 244/194 |
| 2003/0066739 | A1 |   | 4/2003 | Rickenbach et al. |
| 2004/0010354 | A1 |   | 1/2004 | Nicholas et al. |
| 2005/0080495 | A1 | * | 4/2005 | Tessier et al. .................... 700/63 |

(Continued)

FOREIGN PATENT DOCUMENTS

| EP | 0759585 A1 | 2/1997 |
|---|---|---|
| EP | 2058227 A2 | 5/2009 |

(Continued)

OTHER PUBLICATIONS

Juneau et al. (Juneau, T.; Unterkofler, K.; Seliverstov, T.; Zhang, S.; Judy, M., "Dual-axis optical mirror positioning using a nonlinear closed-loop controller," TRANSDUCERS, Solid-State Sensors, Actuators and Microsystems, 12th International Conference on, 2003 , vol. 1, no., pp. 560,563 vol. 1, Jun. 18-12, 2003).*

(Continued)

*Primary Examiner* — Eduardo Colon Santana
*Assistant Examiner* — Said Bouziane
(74) *Attorney, Agent, or Firm* — Cantor Colburn LLP

(57) ABSTRACT

A system for adjusting tactile cues includes a controller having an axis and a cross-axis; an axis tactile cue generated in response to the position of the controller along the axis; a position scaling unit scaling a cross-axis controller position to generate a scaled cross-axis controller position; a force scaling unit scaling a cross-axis controller force to generate a scaled cross-axis controller force; a combiner combining the scaled cross-axis controller position and the scaled cross-axis controller force to generate an adjustment factor; and an adjuster adjusting the axis tactile cue in response to the adjustment factor to generate an adjusted axis tactile cue.

16 Claims, 4 Drawing Sheets

(56) References Cited

U.S. PATENT DOCUMENTS

| | | |
|---|---|---|
| 2008/0234881 A1* | 9/2008 | Cherepinsky et al. ............ 701/7 |
| 2009/0012658 A1 | 1/2009 | Cherepinsky et al. |
| 2009/0125166 A1* | 5/2009 | Johnson et al. ................... 701/3 |
| 2009/0234518 A1 | 9/2009 | Irwin, III et al. |
| 2010/0131123 A1* | 5/2010 | Gannon et al. .................... 701/3 |
| 2011/0168851 A1* | 7/2011 | Cherepinsky ................. 244/223 |
| 2012/0053735 A1* | 3/2012 | Tessier et al. ................. 700/275 |
| 2012/0205494 A1* | 8/2012 | Taylor ........................... 244/223 |
| 2012/0253561 A1* | 10/2012 | Ellis et al. ........................ 701/3 |

FOREIGN PATENT DOCUMENTS

| | | |
|---|---|---|
| GB | 2350698 A | 12/2000 |
| WO | WO 2011048399 A1 * | 4/2011 |

OTHER PUBLICATIONS

European Search Report for International Application No. 12181051.9, Jan. 16, 2013, 7 pages.

* cited by examiner

US 9,102,400 B2

METHODS AND SYSTEMS FOR PROVIDING CONSTANT-FEEL, MULTI-AXIS TACTILE CUES

STATEMENT REGARDING FEDERALLY SPONSORED RESEARCH AND DEVELOPMENT

This invention was made with Government support under W58RGZ-06-D-0045 awarded by the Department of the Army. The Government has certain rights in this invention.

BACKGROUND

The subject matter disclosed herein relates generally to providing tactile cues to an operator of a vehicle, and in particular to methods and systems for providing multi-axis tactile cues to an operator of a vehicle.

Many vehicles, including helicopters, use fly-by-wire (FBW) systems to control vehicle operation. Emerging FBW helicopters provide high levels of augmentation. These systems greatly reduce pilot workload and enhance safety. Early FBW helicopters utilized "passive" controllers. These passive controllers provide constant force feel to the pilots via simple spring/damper mechanisms. As the FBW technology matures, a preference for electronically variable force-feel has emerged. More recent FBW helicopters utilize "active" controllers, also known as active inceptors. These controllers contain high-bandwidth force motors/control systems that allow adjustment of many aspects of the controller feel. With these systems it is possible for the flight control system to provide a variety of tactile cues (such as power cues, level flight cues, control limit cues, etc.) to the pilot. Improvements in providing tactile cues to the pilot would be well received in the art.

SUMMARY

One embodiment includes a system for adjusting tactile cues including a controller having an axis and a cross-axis; an axis tactile cue generated in response to the position of the controller along the axis; a position scaling unit scaling a cross-axis controller position to generate a scaled cross-axis controller position; a force scaling unit scaling a cross-axis controller force to generate a scaled cross-axis controller force; a combiner combining the scaled cross-axis controller position and the scaled cross-axis controller force to generate an adjustment factor; and an adjuster adjusting the axis tactile cue in response to the adjustment factor to generate an adjusted axis tactile cue.

Another embodiment is a method for adjusting tactile cues for a controller having an axis and a cross-axis, the method including obtaining an axis tactile cue in response to a position of the controller along the axis; scaling a cross-axis controller position to generate a scaled cross-axis controller position; scaling a cross-axis controller force to generate a scaled cross-axis controller force; combining the scaled cross-axis controller position and the scaled cross-axis controller force to generate an adjustment factor; and adjusting the axis tactile cue in response to the adjustment factor to generate an adjusted axis tactile cue.

Other aspects, features, and techniques of the invention will become more apparent from the following description taken in conjunction with the drawings.

BRIEF DESCRIPTION OF THE DRAWINGS

Referring now to the drawings wherein like elements are numbered alike in the several FIGURES, in which.

DETAILED DESCRIPTION

Figure 1:
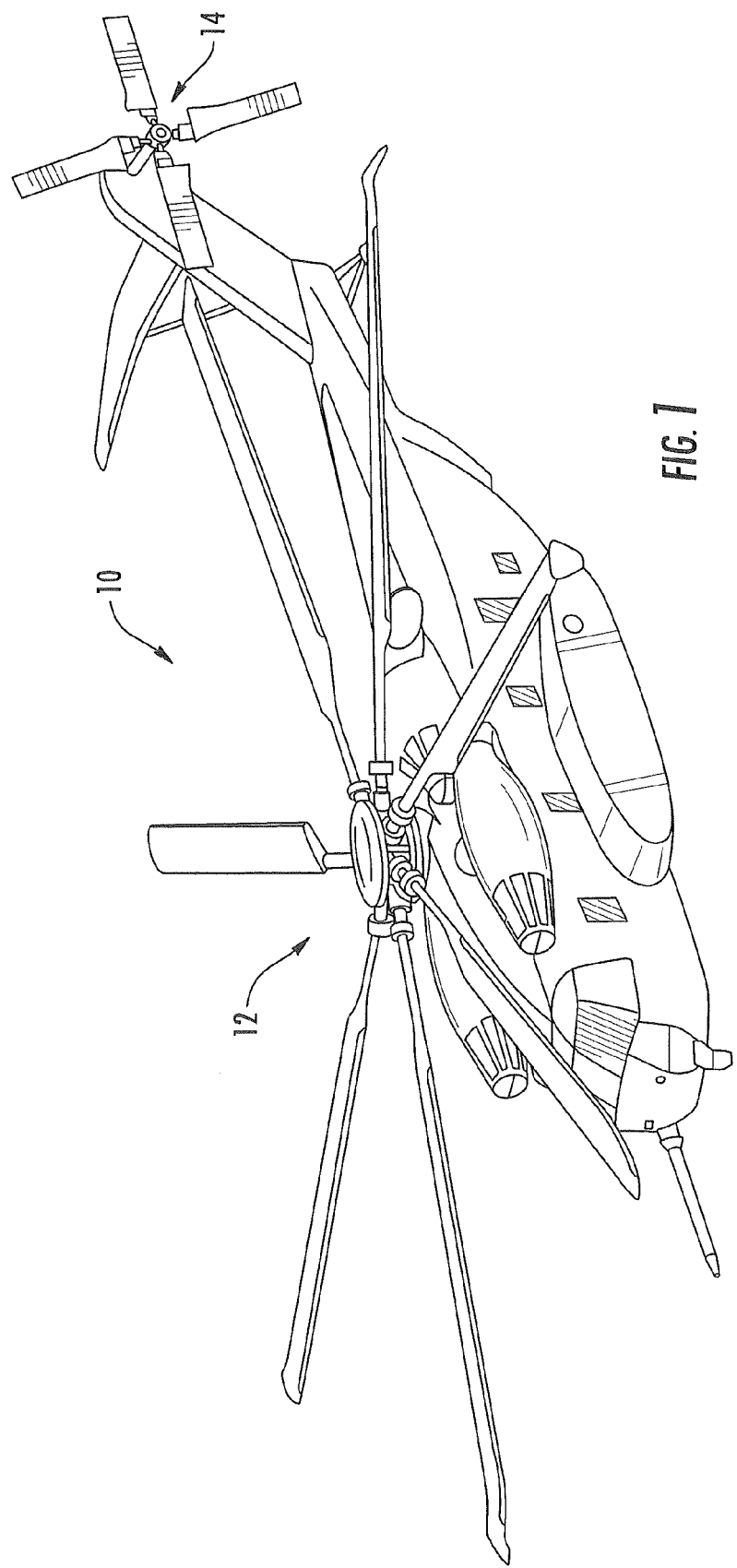
FIG. 1 is a perspective view of an exemplary rotary wing aircraft for use with embodiments of the invention.

Embodiments FIG. 1 illustrates a general perspective view of an exemplary vehicle in the form of a vertical takeoff and landing (VTOL) rotary-wing aircraft 10 for use with embodiments of the invention. The rotary-wing aircraft 10 includes a main rotor assembly 12 and tail rotor assembly 14. Although a particular helicopter configuration is illustrated and described in disclosed embodiments, other configurations and/or machines, such as high speed compound rotary-wing aircraft with supplemental translational thrust systems, dual contra-rotating, coaxial rotor system aircraft, turbo-props, tilt-rotors, tilt-wing aircraft, and fixed-wing aircraft will also benefit from embodiments of the present invention.

Figure 2:
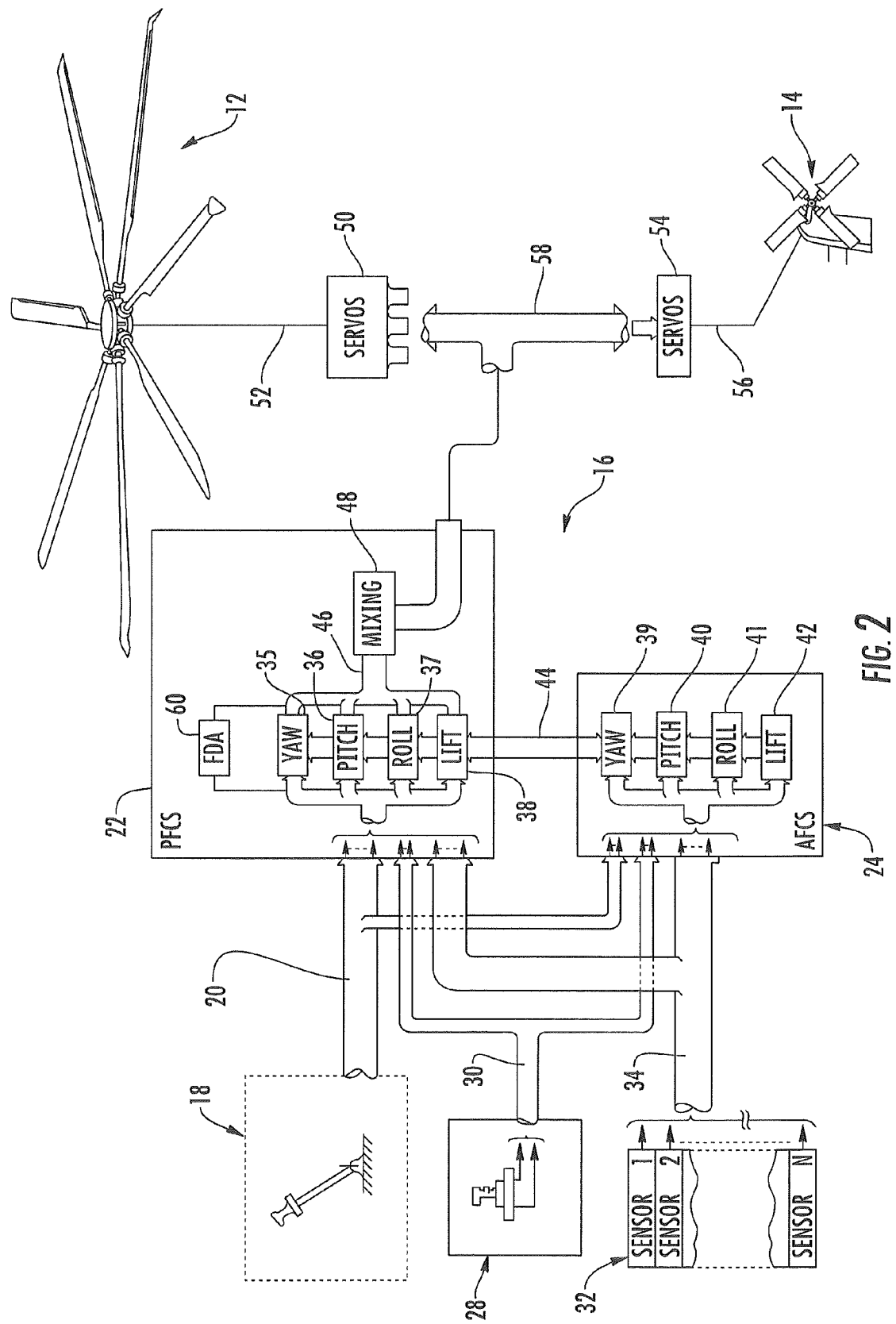
FIG. 2 is a schematic diagram of an exemplary flight control system.

Referring to FIG. 2, a fly-by-wire type flight control system 16 includes a model following control system which shapes the pilot's controller and displacement commands through an inverse vehicle model to produce the desired aircraft response. The system 16 includes a Primary Flight Control System (PFCS) 22 and an Automatic Flight Augmentation and Cuing System (AFCS) 24.

The PFCS 22 is the flight critical portion of the flight control system, while the FACS 24 is the mission critical portion. The FACS 24 augments the performance of the PFCS 22. The PFCS 22 and FACS 24 execute explicit model following control laws to provide both control and stability augmentation. In this control law architecture, pilot commands are shaped directly into desired aircraft responses. These desired commands are then passed through an inverse aircraft model to obtain the control commands required to produce the desired response. The difference between the desired command and the aircraft response is also fed back to drive these errors towards zero, thus improving the model following performance.

The PFCS 22 and FACS 24 each receive the force output command signals of a collective controller 18 on line 20, a cyclic controller 28 on line 30, and the aircraft's sensed parameter signals from sensors 32, on lines 34. The collective controller 18 and the cyclic controller 28 may take various forms including sidearm controllers, a yaw pedal system or other such flight controllers. The pilot command signals on lines 20, 30 and the sensed parameter signals on lines 34 are shown consolidated within trunk lines 32 and 34 in the PFCS and FACS, respectively.

The PFCS 22 and FACS 24 may each contain separate control channel logic laws for controlling the yaw, pitch, roll and lift axes of the aircraft. The logic is included in the PFCS and FACS control modules (schematically represented by blocks 35-38 for the PFCS and blocks 39-42 for the FACS). The sensed parameter signals from aircraft sensors 32, on lines 34, provide the PFCS and FACS with the aircraft's angular rate and attitude response to the rotor command signals. The PFCS logic provides rotor command signals and the FACS logic provides conditioning and/or trimming of the PFCS four axis logic functions. The PFCS and FACS logic modules interconnect through bus 44 to provide rotor command signals on output lines 46 to a mixing function 48 which communicates commands on lines 58 for the displacement of servos 50 and linkages 52 to control the tip path plane of the main rotor 12. A mixed command signal is also provided on line 58 to the tail rotor servos 54 which control the thrust of the tail rotor 14 through linkages 56.

Cyclic controller 28 is a multi-axis active controller (e.g., an active inceptor) that provides force feel to the control input (i.e., the stick) to provide cues to the operator. An issue presents itself as a designer tries to set the size of these cues. In the case of a center detent, for example, setting the depth too low will produce a detent that cannot be easily detected by the pilots and setting depth too high produces an undesirable breakout force. It is possible, with some experimentation to set the size of each cue to an optimal value. However, in the case of a cyclic controller or other multi-axis controller, the pilot is manipulating more than one axis at a time with the same hand. This results in an apparent change in sensitivity to the size of these cues. For example, a 0.75 lb (0.34 kg) center detent in the pitch axis might be quite perceptible if only pitch inputs are made (i.e. the controller is only moved in a single axis). If the pilot is commanding pitch and roll simultaneously, perceiving a 0.751 lb (0.34 kg) center detent in pitch becomes problematic due to 2-3 lbs (0.9-1.36 kg) of force in the roll axis. Embodiments adjust the tactile cues applied to the multi-axis controller based on the position of the controller in a cross-axis.

Figure 3:
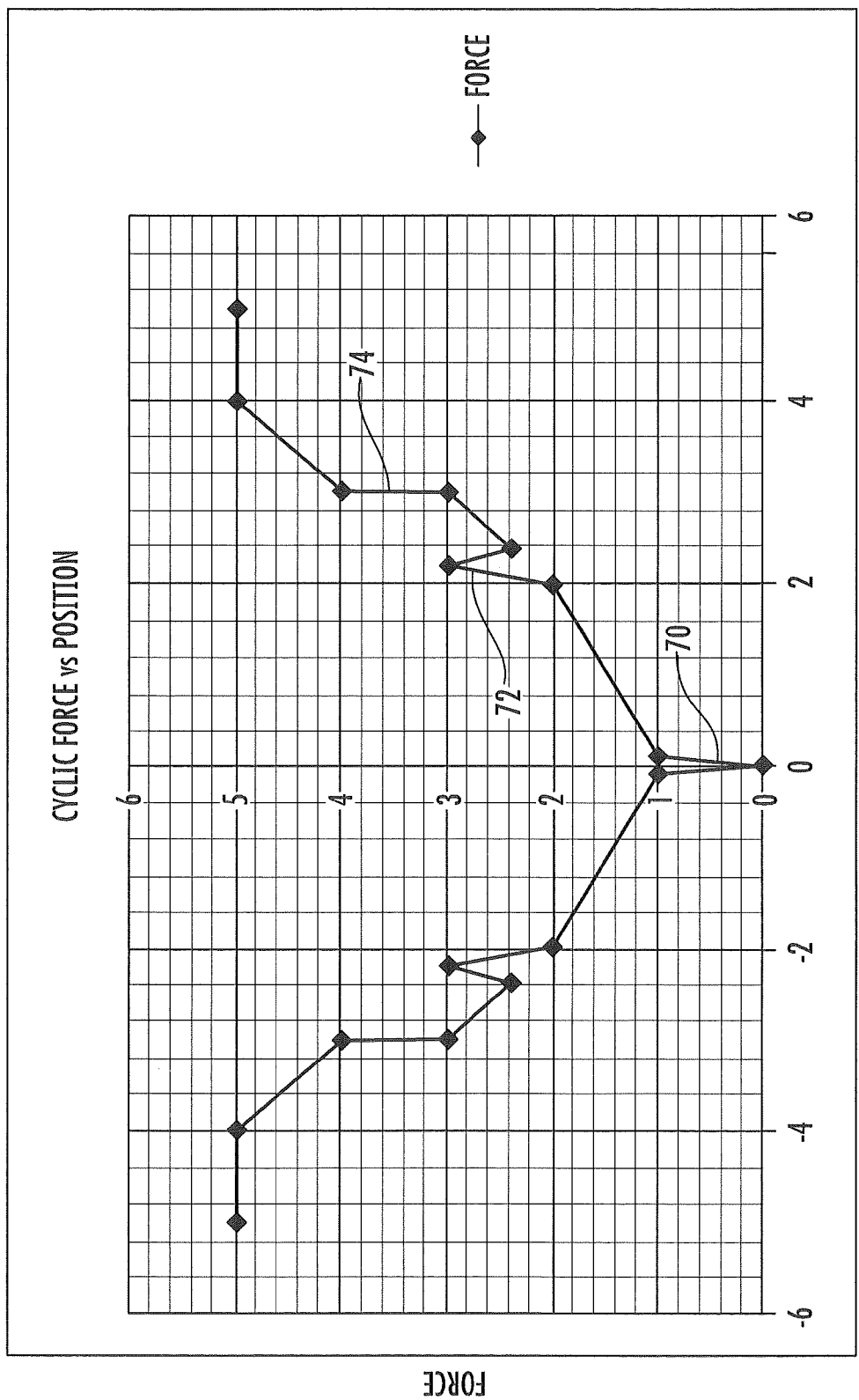
FIG. 3 depicts exemplary tactile cues for a control axis.

FIG. 3 depicts a sample plot of force versus position for a single axis (e.g., pitch) of a cyclic controller, designed to provide a variety of tactile cues to the pilot. In this scenario, several tactile cues are shown. A center detent 70 is present (the active inceptor is programmed to emulate a unique trim cyclic), a gate 72 is used to cue the pilot of power limits and a soft-stop 74 is used to cue control limits. The tactile cues may be described as having a depth (in force) and a width (in position). As noted above, if the pilot is only manipulating pitch, then these cues are easily noticeable by the pilot. If, however, the pilot is simultaneously adjusting pitch and roll, the pitch tactile cues may not be significant enough to be felt by the pilot, as the roll force is simultaneously applied to the controller.

Figure 4:
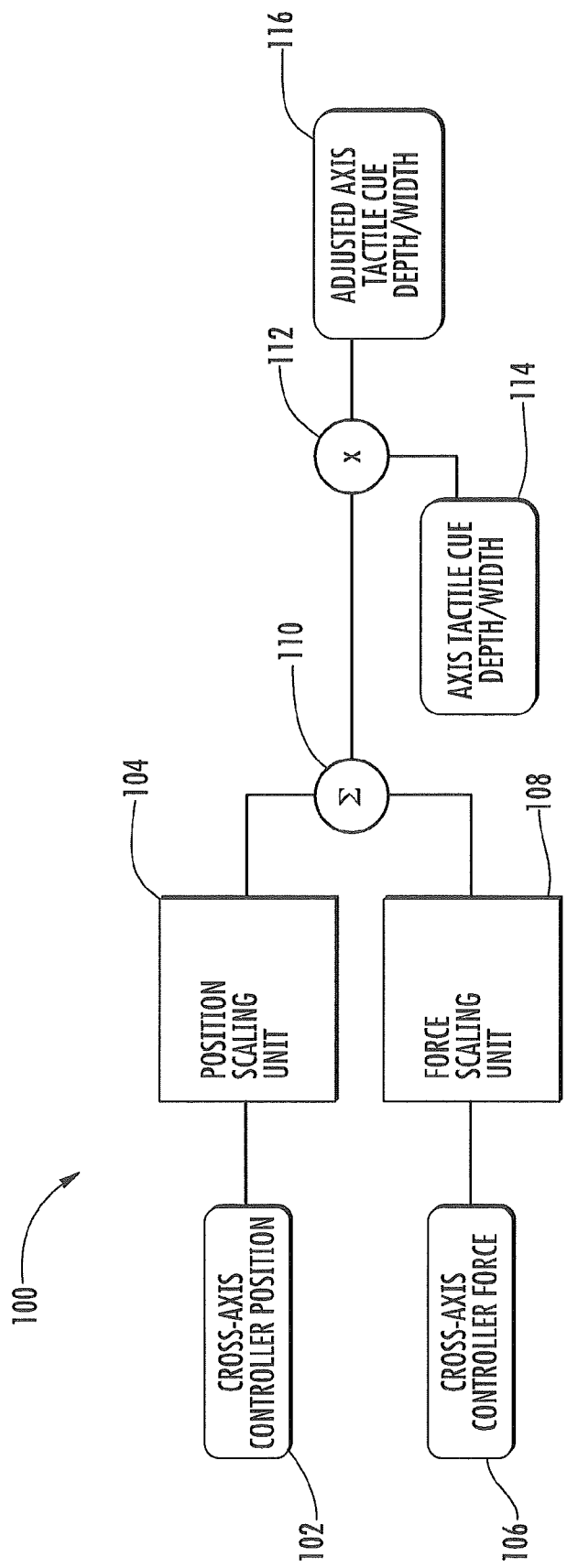
FIG. 4 is a block diagram of a system for adjusting tactile cues in exemplary embodiments.

FIG. 4 is a block diagram of a system 100 for adjusting tactile cues applied to a multi-axis controller in exemplary embodiments. System 100 may be implemented as part of the FACS 24 in FIG. 1. System 100 adjusts the tactile cue (e.g., depth in force and/or width in position) based on the cross-axis controller position and cross-axis controller force applied to the controller. The cross-axis controller position 102 is input to a position scaling unit 104 to generate a scaled cross-axis controller position. Position scaling unit 104 may be a look-up table that indexes the scaled cross-axis controller position by the cross-axis controller position. Alternatively, the position scaling unit 104 may be implemented by a mathematical function. Similarly, the cross-axis controller force 106 is input to a force scaling unit 108 to generate a scaled cross-axis controller force. Force scaling unit 108 may be a look-up table that indexes the scaled cross-axis controller force by the cross-axis controller force. Alternatively, the force scaling unit 108 may be implemented by a mathematical function.

The scaled cross-axis controller position and scaled cross-axis controller force are then combined at combiner 110 to define an adjustment factor. Combiner 110 may be a simple summer, or may involve a more complex mathematical operation, a two-input look-up table, etc. The adjustment factor is then applied to an adjuster 112, which adjusts the axis tactile cue 114 by the adjustment factor. The adjuster 112 may be a multiplier or may involve a more complex mathematical operation, a two-input look-up table, etc. The output of adjuster 112 is an adjusted axis tactile cue 116.

To illustrate further, take an example where the axis tactile cue 114 corresponds to the soft gate 72 from FIG. 3 on the pitch axis of the cyclic controller 28. In this example, the pilot is also adjusting roll by moving controller 28 along the cross-axis. The controller 28 will experience force feedback in response to the roll maneuver, making it more difficult for the pilot to feel the soft gate 72 tactile cue on the pitch axis. System 100 uses the cross-axis controller position and cross-axis controller force to adjust the soft gate cue 72 to increase the depth (i.e., force) and/or the width (i.e. position) of the soft gate cue 72 to render this tactile cue more perceptible by the pilot.

Embodiments provide compensation to account for cross-axis feel and greatly open the design space for tactile cueing in multi-axis controllers. Embodiments allow the pilot to make large inputs in one axis, while retaining the other axis in a center detent, which is a desirable characteristic for a FBW controller and facilitates meeting handling qualities specifications. Although embodiments have been discussed with reference to a multi-axis controller for a helicopter, it is understood that features may be applied to other systems using multi-axis, active controllers providing tactile cues to operators. Further, only a single cross-axis is depicted in FIG. 4. It is understood that embodiments may use position and force from more than one cross-axis to alter tactile cues on an axis. Further, the axes involved need not be perpendicular to utilize embodiments of the invention.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiment of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for adjusting tactile cues for a controller having an axis and a cross-axis, the method comprising;

obtaining an axis tactile cue in response to a position of the controller along the axis;

scaling a cross-axis controller position to generate a scaled cross-axis controller position;

scaling a cross-axis controller force to generate a scaled cross-axis controller force;

combining the scaled cross-axis controller position and the scaled cross-axis controller force to generate an adjustment factor; and adjusting the axis tactile cue in response to the adjustment factor to generate an adjusted axis tactile cue to be applied along the axis of the controller;

wherein the axis tactile cue has a depth and a width, and the adjusted axis tactile cue has one of an adjusted depth and an adjusted width;

wherein the axis and cross-axis are perpendicular;

wherein the controller is coupled to a servo, the servo coupled to a linkage to control a rotor of a rotary wing aircraft;

wherein the controller is coupled to the servo in a fly-by-wire system with no direct mechanical connection between the controller and the servo and with no direct mechanical connection between the controller and the linkage.

2. The method of claim 1 wherein scaling the cross-axis controller position is performed by a look up table indexing the scaled cross-axis controller position by the cross-axis controller position.

3. The method of claim 1 wherein scaling the cross-axis controller position is performed by a mathematical operation on the cross-axis controller position to generate the scaled cross-axis controller position.

4. The method of claim 1 wherein scaling the cross-axis controller force is performed by a look up table indexing the scaled cross-axis controller force by the cross-axis controller force.

5. The method of claim 1 wherein scaling the cross-axis controller force is performed by a mathematical operation on the cross-axis controller force to generate the scaled cross-axis controller force.

6. The method of claim 1 wherein the combining includes summing the scaled cross-axis controller position with the scaled cross-axis controller force to generate the adjustment factor.

7. The method of claim 1 wherein the adjusting includes multiplying the axis tactile cue by the adjustment factor to generate the adjusted axis tactile cue.

8. A system for adjusting tactile cues comprising:
a controller having an axis and a cross-axis;
an axis tactile cue generated in response to the position of the controller along the axis;
a position scaling unit scaling a cross-axis controller position to generate a scaled cross-axis controller position;
a force scaling unit scaling a cross-axis controller force to generate a scaled cross-axis controller force;
a combiner combining the scaled cross-axis controller position and the scaled cross-axis controller force to generate an adjustment factor; and
an adjuster adjusting the axis tactile cue in response to the adjustment factor to generate an adjusted axis tactile cue to be applied along the axis of the controller;
wherein the axis tactile cue has a depth and a width, and the adjusted axis tactile cue has one of an adjusted depth and an adjusted width;
wherein the axis and cross-axis are perpendicular;
wherein the controller is coupled to a servo, the servo coupled to a linkage to control a rotor of a rotary wing aircraft;
wherein the controller is coupled to the servo in a fly-by-wire system with no direct mechanical connection between the controller and the servo and with no direct mechanical connection between the controller and the linkage.

9. The system of claim 8 wherein the position scaling unit is a look up table indexing the scaled cross-axis controller position by the cross-axis controller position.

10. The system of claim 8 wherein the position scaling unit performs a mathematical operation on the cross-axis controller position to generate the scaled cross-axis controller position.

11. The system of claim 8 wherein the force scaling unit is a look up table indexing the scaled cross-axis controller force by the cross-axis controller force.

12. The system of claim 8 wherein the force scaling unit performs a mathematical operation on the cross-axis controller force to generate the scaled cross-axis controller force.

13. The system of claim 8 wherein the combiner is a summer summing the scaled cross-axis controller position with the scaled cross-axis controller force to generate the adjustment factor.

14. The system of claim 8 wherein the adjuster is a multiplier multiplying the axis tactile cue by the adjustment factor to generate the adjusted axis tactile cue.

15. The system of claim 8 wherein the axis tactile cue has a depth and a width, and the adjusted axis tactile cue has both an adjusted depth and an adjusted width.

16. The system of claim 8 wherein the axis corresponds to pitch and the cross-axis corresponds to roll.

\* \* \* \* \*